May 11, 1926. 1,584,135
H. M. PFLAGER
CAR TRUCK AND METHOD OF ASSEMBLING THE SAME
Filed June 7, 1924 2 Sheets-Sheet 1
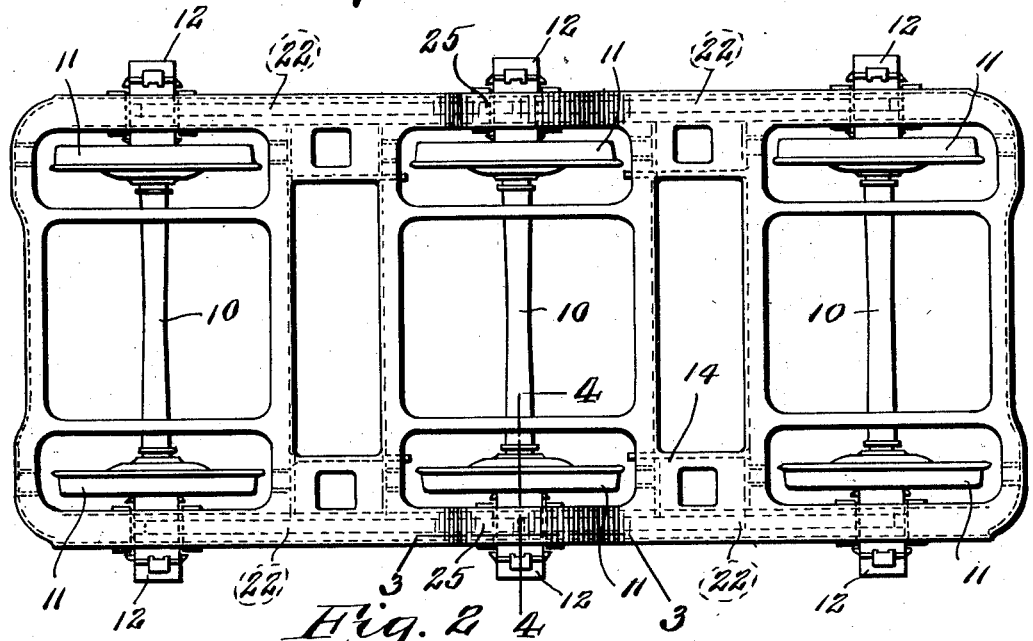
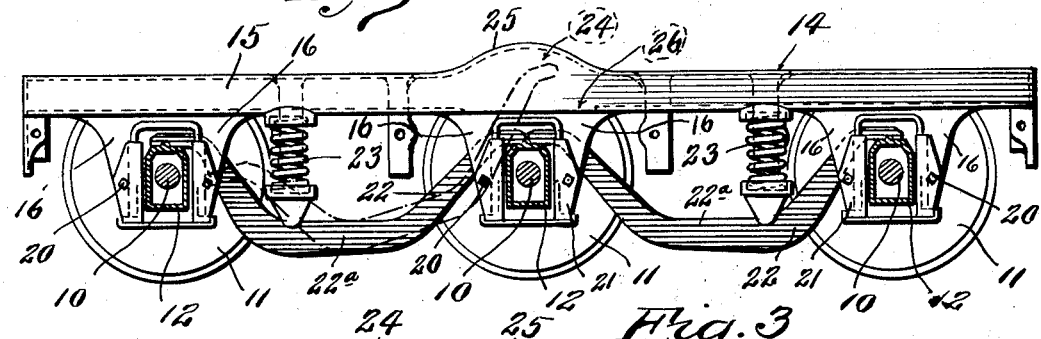
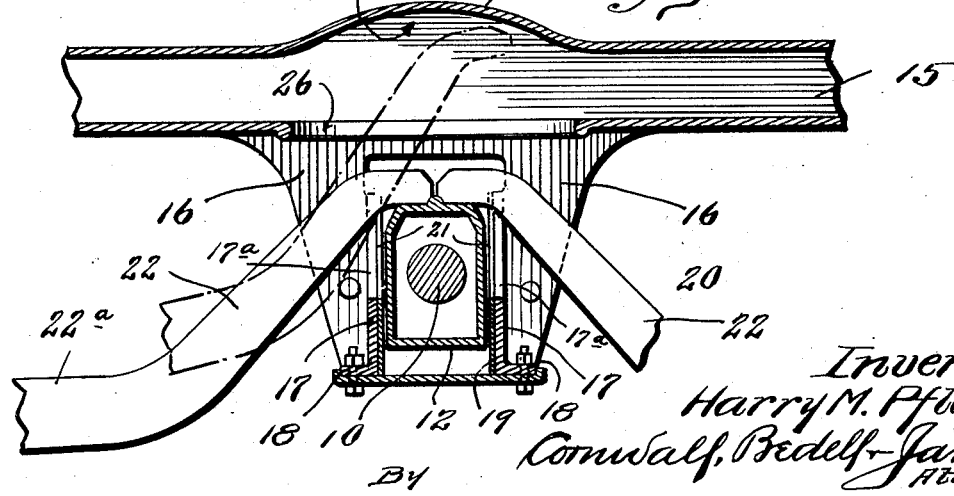
Inventor
Harry M. Pflager
By Cornwall, Bedell & James
Attys.

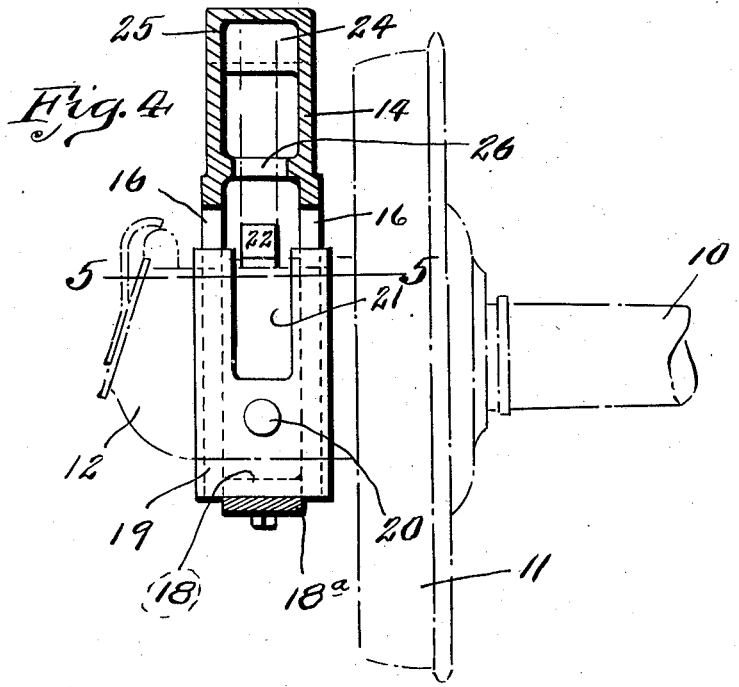
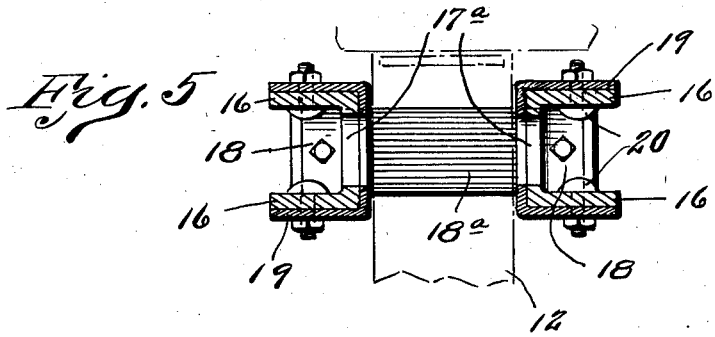
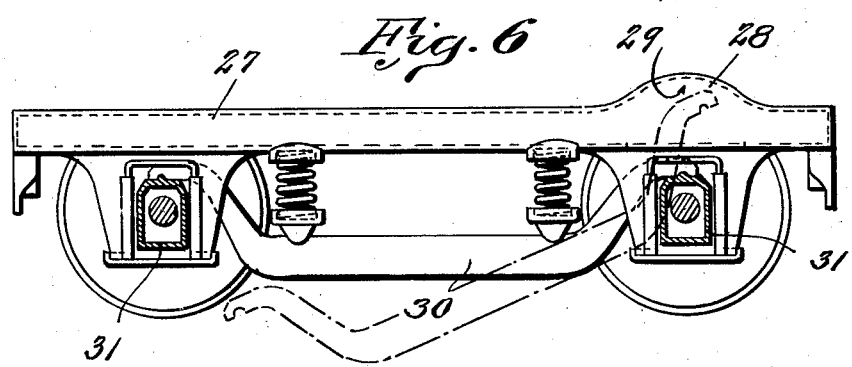

Patented May 11, 1926.

1,584,135

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK AND METHOD OF ASSEMBLING THE SAME.

Application filed June 7, 1924. Serial No. 718,518.

This invention relates to new and useful improvements in car truck construction and the objects of the invention are to so construct the car truck frame as to permit the assembly of equalizer bars in their operative positions by manipulating said equalizing bars whereby the ends thereof are moved in positions to clear the pedestals, the latter being formed integral with the side frame members or wheel pieces or secured thereto before the assembly of the equalizer bars, said equalizer bars, when occupying their operative positions, being disposed in vertical planes with the center lines of the side members and with the journal boxes, thereby maintaining said bars in perfect working alignment with said parts.

Further objects of the invention are to provide a car truck frame, the side members of which are provided with distorted or enlarged portions forming clearing spaces for permitting the equalizer bars to be moved in displaced positions preliminary to their insertion or withdrawal from their operative positions on said side frame, said bars, when occupying such displaced positions, being adapted to be manipulated so as to clear the pedestals which can be formed integral with the side frame members or secured thereto before the assembly of said equalizer bars.

With these and other objects in view, my invention consists in certain novel features of construction and arrangement of parts, hereinafter more fully described and claimed, and illustrated in the accompanying drawings, in which—

Figure 1 is a top plan view of a six wheel car truck frame with the equalizer bars arranged in operative positions therein.

Figure 2 is a side elevational view of Figure 1.

Figure 3 is an enlarged vertical section taken on lines 3—3 of Figure 1.

Figure 4 is an enlarged transverse section taken on line 4—4 of Figure 1.

Figure 5 is a horizontal cross section taken on line 5—5 of Figure 4.

Figure 6 is a side elevational view showing my invention applied to a four wheel truck.

Heretofore, the pedestals were either made separable from the side frame members, thus permitting insertion of equalizer bars in their proper positions before the attachment of said pedestals to the frame or said equalizer bars were arranged in pairs on each side of the side frame member.

Where a single piece equalizer bar is to be used in vertical plane with the side frame member having pedestals formed integral therewith, it is necessary to first move the equalizer bar in a displaced position so as to bring the ends thereof clear of the pedestals inasmuch as the over-all length of the equalizer bar is greater than the distance between the corresponding pedestals. In order to permit this displacement of the bar, I provide the side frame members at suitable points with extensions or enlargements which provide clearing spaces whereby, in assembling the equalizer bars, the latter can be first disposed in a displaced position with one end thereof being located above its operative point occupying a clearing space formed in the side frame member and having its opposite or lower end free to swing upwardly clear of its corresponding pedestal whereupon said bar can then be shifted so as to bring both ends of said bar in their proper operative positions on the respective journal boxes.

Referring by numerals to the accompanying drawings, 10 designates the axles, 11 wheels and 12 journal boxes of the truck. A truck frame 14 is provided with side members or wheel pieces 15 which are preferably box-shaped in cross section. Depending from said side members and formed integral therewith are pedestals 16 having their inner or opposed walls 17 provided with open-ended slots 17ª and having their lower ends formed with horizontal flange 18. Bearing plates 19 are secured to pedestals 16 by suitable fastening devices 20 and serve to provide bearing surfaces for engaging the journal boxes which are located between the respective pedestals. Bearing plates 19 are provided with cut-away portions 21 corresponding to open-ended slots 17ª of pedestals 16.

Equalizer bars 22 which are preferably of the depressed type, as indicated at 22ª, have their ends resting on top of the corresponding journal boxes and are located below the respective side members and in vertical planes with the center lines thereof. Coil springs 23 are interposed between frame 14 and equalizer bars 22 and support said frame.

In assembling the equalizer bars in position it is necessary, since the distances between the respective pedestals is less than the length of the equalizer bars, to tilt each bar and place its one end in a recessed portion 24 formed in each side frame member 15 at the appropriate point. When in this position the lower or opposite end of said bar can be swung upwardly clear of its corresponding pedestal as shown in dotted lines in Figure 2. After this end of the bar is moved upwardly a sufficient distance, the bar can be shifted longitudinally so as to properly space it between the journal boxes and bring the ends of said bar in proper position thereon. The recessed portion 24 is formed by extending or curving a portion of the side member 15 upwardly as indicated at 25, thereby providing sufficient clearance space for receiving and accomodating one end of the equalizer bar when the latter occupies displaced position. In order to provide access to this recessed portion 24, the lower or bottom wall of each side member 15 is formed with an opening 26 which is located immediately below said extended or recessed portion and is of proper dimensions to enable the bar to pass therethrough.

In removing the bar from its position, the same method is followed, the bar being first shifted longitudinally so as to bring one end thereof in the recessed portion 24 whereupon the opposite end is free to move downwardly without interfering with the corresponding pedestal.

In Figure 6 a four wheel car truck is shown having a frame 27, the side frame members of which are provided with an enlarged portion 28 for providing clearance space 29 and permitting one end of bar 30 to be moved thereinto in assembling and disassembling the same.

This is a companion application of application Serial Number 718,516 for car truck and method of assembling the same, and application Serial Number 718,517 for car truck and method of assembling the same, filed of even date.

While I have described and illustrated the prefered form of my invention, it is obvious that various changes in the construction of the truck frame could be made and substituted for those herein disclosed without departing from the spirit thereof.

I claim:

1. In a car truck, a wheel piece, a pedestal carried thereby, an upward projection on said wheel piece over said pedestal, said wheel piece being recessed from below beneath said projection to permit the insertion of the end of an equalizer bar.

2. In a car truck, a wheel piece having an imperforate upper face and side walls, the bottom wall of said wheel piece being provided with an opening disposed above the journal box opening, a pedestal fixed to said wheel piece, said wheel piece being adapted to have one end of a depressed equalizer projected thereinto through said opening to permit displacement of same during its application in operative position.

3. In a car truck, a wheel piece, having upper and lower walls, a pedestal carried thereby, said wheel piece having an opening in its lower wall over said pedestal and an inner recess in its upper wall over said opening.

4. In a six wheel car truck, a wheel piece, spaced pedestals fixed thereon, said wheel piece having an opening in its lower face over the central pedestal to permit one end of an equalizer to be projected into said wheel piece.

5. A car truck comprising a frame including side members having upwardly curved portions to provide clearance recesses, pedestals formed integral with said side members, journal boxes arranged in the respective pedestals, and equalizer bars carried by said boxes and adapted to be placed in operative position thereon by temporarily displacing said bar whereby its one end is disposed in the clearance recess thereby permitting the other end to be swung upwardly into its operative position.

6. A car truck comprising a frame including side members, the latter being formed with enlarged portions for providing clearance spaces, pedestals on said side members, journal boxes arranged in said pedestals, and equalizer bars arranged in vertical planes with said side members and having their ends bearing on said journal boxes, said bars being adapted to be moved into and out of operative positions by displacing each bar so that one end thereof is moved into the clearance space formed in the corresponding side member, thereby permitting its opposite end to clear the corresponding pedestal.

7. A car truck comprising a frame including side members, the latter being provided with upwardly curved portions forming clearance spaces, said curved portions being open at their undersides, pedestals formed integral with said side members, journal boxes arranged in said pedestals, axles journaled in said boxes, wheels carried by said axles, and equalizer bars carried by said journal boxes in vertical planes with said side members and movable into displaced positions relative to the side members and pedestals by virtue of said clearance spaces, thereby enabling said bars to be moved into and out of operative positions.

8. A car truck comprising a frame including side members, pedestals integral therewith and having portions of their inner or opposed walls cut away to provide clearance spaces, journal boxes arranged in said pedestals, axles journaled in said boxes, wheels carried by said axles, and equalizer bars arranged in vertical planes with the respective side members and having their ends supported on said boxes, said bars being adapted to be placed in operative positions by being first moved into displaced positions for permitting one end thereof to be swung upwardly clear of the respective pedestals, said side members being distorted to provide clearing spaces for the opposite ends of said bars when the latter are displaced.

9. In a car truck construction, the combination with axles and wheels, of side frame members having pedestals formed integral therewith, journal boxes arranged between said pedestals, and equalizer bars carried by said journal boxes in vertical planes with said side frame members and adapted to be moved into and out of operative relation by being moved into displaced positions for permitting one of their ends to clear portions of said pedestals, said side frame members having distorted portions for providing clearance spaces for the opposite ends of said bars when the latter are displaced.

10. In a car truck construction, the combination with axles and their wheels, of side frame members, pedestals formed integral therewith, journal boxes arranged in said pedestals, and depressed equalizer bars carried by said journal boxes in vertical planes with the respective side frame members, each of said bars being adapted to be moved preliminary to its insertion and withdrawal from operative position in a displaced position for permitting its one end to clear the respective pedestal, a portion of each side frame member being distorted to accommodate the other end of the displaced bar.

11. The method of assembling a car truck including side frame members carrying pedestals and a depressed bar, said side frame members having distorted portions to provide clearance spaces for one end of the bar, said method consisting in first displacing the equalizer bar whereby its one end is located in said distorted portion, then swinging said bar upwardly to bring its opposite end past the corresponding pedestal, and then shifting said bar longitudinally to bring the ends of said bar in operative engagement with the respective journal boxes.

12. The method of assembling a car truck having side frame members provided with pedestals and depressed equalizer bars, said side frame members being provided with upwardly curved extensions to form clearance spaces, said method consisting in placing the equalizer bar in a displaced position so that its one end is disposed in said clearance space above its respective journal box and the opposite end of said bar clears the corresponding pedestal, then swinging said bar upwardly and bringing the opposite or lower end of said bar past its corresponding pedestal, and then shifting said bar so as to bring its ends in operative position on the journal boxes.

13. The method of assembling an equalizer bar with a truck frame and pedestals including the projecting of one end of the equalizer bar into the frame wheel piece from below and swinging the other end of the equalizer bar into its proximate assembled position.

14. The method of assembling an equalizer bar with a truck frame and pedestals including the insertion of one end of the equalizer bar through one pedestal and into a recess provided in the lower face of the truck wheel piece over said pedestal and then moving the other end of said equalizer bar upwardly into the other pedestal.

15. The method of assembling an equalizer bar with a truck frame and pedestals including the insertion of one end of the equalizer bar through one pedestal and into a recess provided in the lower face of the truck wheel piece over said pedestal, then moving the other end of said equalizer bar upwardly into the other pedestal, and then moving the bar longitudinally and downwardly into assembled position.

16. In a car truck, wheel pieces, transom members formed integral therewith, pedestals cast integral with said wheel pieces, said wheel pieces having portions thereof recessed to permit the insertion of one end of an equalizer bar.

17. In a car truck, an underframe comprising wheel pieces, transoms and pedestals cast integrally, said wheel pieces having recessed portions for providing clearances for the temporary reception of one end of an equalizer bar.

18. In a car truck, wheel pieces, a cross member formed integral therewith, pedestals integral with said wheel pieces, said wheel pieces having recessed portions for permitting the temporary reception therein of one end of an equalizer bar.

19. A single piece cast underframe for car trucks comprising wheel pieces, a cross member uniting said wheel pieces, and pedestals integral with said wheel pieces, said wheel pieces being provided in their lower walls with suitable openings and having their upper walls recessed to permit the insertion of one end of an equalizer bar in said wheel piece.

20. In a car truck, side frames, end pieces and transom members cast integral with each other, and pedestals cast integral with said side frames, said side frames being formed with downwardly opening recesses for temporarily receiving one end of an equalizer bar.

21. A single piece cast underframe for car trucks comprising side frames, end pieces, transom members and pedestals formed integral with said side frames, the latter being provided at suitable points with recessed portions adapted to accommodate one end of an equalizer bar when the latter is in displaced position.

22. In a car truck, a wheel piece and a pedestal formed integral therewith, said wheel piece and said pedestal being provided with openings coinciding with the journal box opening of said pedestal for permitting one end of a depressed equalizer bar to enter said wheel piece during the assembly of said bar into operative position.

23. In a car truck, a wheel piece and a pedestal formed integral therewith, said wheel piece being provided at a point above the journal box opening with a vertical opening and one of the jaws of said pedestal being formed with a transverse opening arranged in correlation with the opening of said wheel piece.

24. In a car truck, a wheel piece and a pedestal formed integral therewith, said wheel piece being provided at a point above the journal box opening with a vertical opening and one of the jaws of said pedestal being formed with a transverse opening arranged in correlation with the opening of said wheel piece and a depressed equalizer bar adapted to be assembled in operative position by being displaced and having one end projected into said wheel piece through said openings.

25. In a car truck, a wheel piece, and pedestal jaws formed integral therewith, the bottom wall of said wheel piece being provided with an opening extending between said jaws, and one of said pedestal jaws being provided in its transverse wall with an opening extending downwardly from the opening of said wheel piece.

26. In a car truck, a wheel piece box-shaped in cross section, and pedestal jaws formed integral therewith and channel-shaped in cross section, one of said jaws being provided in its web portion with an opening extending downwardly from said wheel piece and adapted to receive one end of a depressed equalizer bar.

27. A car truck comprising a frame including wheel pieces provided in their lower faces with openings, pedestals formed integral with said wheel pieces and provided in their transverse walls with openings adjoining said wheel piece openings, and equalizer bars adapted to be applied in operative position by displacing each bar whereby one of its ends is entered through said openings into said wheel piece to permit the other end to be moved upwardly into operative position.

28. In a car truck, a wheel piece, a pedestal formed integral therewith and provided with a transverse opening for receiving one end of an equalizer bar, there being an opening formed in the lower face of said wheel piece correlated with said pedestal opening for temporarily admitting one end of an equalizer bar into said wheel piece.

29. In a car truck, a wheel piece box-shaped in cross section, a pedestal formed integral therewith, said wheel piece being provided in its bottom wall with an opening adapted to receive one end of a depressed equalizer bar whereby said bar can be moved into and out of operative positions by displacing said bar so that one end thereof is entered into said wheel piece, thereby permitting the opposite end of said bar to clear the corresponding pedestal.

30. In a car truck, a wheel piece, pedestal jaws formed integral therewith, said wheel piece being provided above said pedestal jaws with an opening for providing ingress within said wheel piece, said jaws being provided with transverse openings aligned with said wheel piece opening, a journal box between said jaws, and depressed equalizer bars supported by said box and adapted to be placed in operative positions thereon by displacing each bar whereby one end thereof is temporarily projected through said openings into said wheel piece.

31. A car truck comprising a frame including wheel pieces, pedestals formed integral therewith and having certain of their transverse walls provided with openings, said wheel pieces being provided in their bottom walls with openings adjoining the openings of said pedestals, journal boxes arranged in said pedestals, and equalizer bars arranged in vertical planes with the respective wheel pieces and having their ends supported on said boxes, said bars being adapted to be placed in operative positions by being displaced whereby one end thereof is moved through said openings within said wheel piece to permit the opposite end to be brought upwardly in operative position.

32. The method of assembling an equalizer bar with a truck frame and pedestals formed integral therewith, said truck frame being provided in its bottom wall with openings and said pedestals being provided with transverse openings arranged adjacent to said truck frame openings whereby one end of the equalizer bar is projected through said openings into said wheel piece, and the opposite end of said bar is moved upwardly and through the opening of the corresponding pedestal.

33. The method of assembling a depressed equalizer bar with a wheel piece and pedestals carried thereby, consisting in placing said equalizer bar in a displaced position, with one end thereof inserted into said wheel piece through openings formed in the bottom wall thereof and in said pedestal, whereby the opposite end of said bar is clear of the respective pedestal and can be brought upwardly in operative alignment with said pedestal.

34. The method of assembling an equalizer bar with a wheel piece and pedestals formed integral therewith, and consisting in the insertion of one end of the equalizer bar through openings formed in the pedestals and in the bottom wall of said wheel piece thereinto, then bringing the other end of said equalizer bar upwardly, and then moving said equalizer bar in proper operative position.

In testimony whereof I hereunto affix my signature this 28th day of May, 1924.

H. M. PFLAGER.